(12) United States Patent
Hartmann (10) Patent No.: US 10,079,523 B2
(45) Date of Patent: Sep. 18, 2018

(54) REDUCING THE ENERGY CONSUMPTION IN A SYSTEM

(71) Applicant: Bernd Hartmann, Grafschaft-Leimersdorf (DE)

(72) Inventor: Bernd Hartmann, Grafschaft-Leimersdorf (DE)

(73) Assignee: Deutsche Post AG, Bonn (DE)

( * ) Notice: Subject to any disclaimer, the term of this patent is extended or adjusted under 35 U.S.C. 154(b) by 476 days.

(21) Appl. No.: 14/953,549

(22) Filed: Nov. 30, 2015

(65) Prior Publication Data
US 2016/0087508 A1 Mar. 24, 2016

Related U.S. Application Data

(63) Continuation of application No. PCT/EP2014/061019, filed on May 28, 2014.

(30) Foreign Application Priority Data

Jun. 11, 2013 (DE) .................. 10 2013 106 052

(51) Int. Cl.
| | |
|---|---|
| F02B 63/04 | (2006.01) |
| F03G 7/08 | (2006.01) |
| H02K 7/18 | (2006.01) |
| B65H 31/10 | (2006.01) |
| B65H 31/12 | (2006.01) |
| B65B 5/10 | (2006.01) |

(52) U.S. Cl.
CPC ................ H02K 7/18 (2013.01); B65B 5/10 (2013.01); B65H 31/10 (2013.01); B65H 31/12 (2013.01); B65H 2301/53 (2013.01); B65H 2403/946 (2013.01); B65H 2601/525 (2013.01)

(58) Field of Classification Search
USPC .......... 290/1 R; 414/462, 498, 546, 556, 557
See application file for complete search history.

(56) References Cited

U.S. PATENT DOCUMENTS 2,348,993 A * 5/1944 Novotney ............. B60P 1/4414
414/557
2,456,805 A * 12/1948 Wohlforth ............. B60P 1/4414
414/545

(Continued)

FOREIGN PATENT DOCUMENTS

DE 10 2006 061 841 A1 7/2008
DE 11 2007 001 092 T5 4/2009

(Continued)

*Primary Examiner* — Pedro J Cuevas
(74) *Attorney, Agent, or Firm* — Reinhart Boerner Van Deuren P.C.

(57) ABSTRACT

A system comprises a device (300) for receiving and transporting objects and a generator (402). The device (300) has an adjusting mechanism (305, 306) and a base (304) that can be adjusted in height by means of the adjusting mechanism (305, 306). The adjusting mechanism (305, 306) is designed in such a way that the base (304) can be lowered by a weight of objects received. The adjusting mechanism (305, 306) is also able to be connected or is connected to the generator (402) in such a way that the generator (402) is driven and converts mechanical energy into electrical energy while the base (304) is being lowered.

20 Claims, 4 Drawing Sheets

(56) References Cited

U.S. PATENT DOCUMENTS

| | | | | |
|---|---|---|---|---|
| 2,525,424 A * | 10/1950 | Novotney | B60P 1/4414 | 414/557 |
| 2,792,135 A * | 5/1957 | Wood | B60P 1/4414 | 296/56 |
| 3,057,491 A * | 10/1962 | Schlensker | B60P 1/4414 | 414/557 |
| 3,451,572 A * | 6/1969 | Rossoni | B60P 1/4414 | 414/498 |
| 3,771,672 A * | 11/1973 | Randall | B60P 1/4414 | 414/557 |
| 3,799,373 A * | 3/1974 | Randall | B60P 1/4457 | 414/557 |
| 3,883,014 A * | 5/1975 | Glomski | B60P 1/4414 | 296/57.1 |
| 3,931,903 A * | 1/1976 | Johnson | B60R 9/06 | 414/462 |
| 4,079,988 A * | 3/1978 | Randall | B60P 1/4414 | 296/57.1 |
| 4,147,261 A * | 4/1979 | Dautel | B60P 1/4478 | 414/557 |
| 4,202,153 A * | 5/1980 | Lerner | B65B 43/123 | 53/258 |
| 4,273,217 A * | 6/1981 | Kajita | A61G 3/06 | 187/200 |
| 4,593,840 A * | 6/1986 | Chown | B60R 9/06 | 224/484 |
| 4,662,809 A | 5/1987 | Sturtz et al. | | |
| 4,729,712 A * | 3/1988 | Corley, Jr. | B60P 1/4414 | 414/537 |
| 4,836,736 A * | 6/1989 | Neagu | B60P 1/445 | 414/557 |
| 5,100,282 A * | 3/1992 | Maier | B60P 1/4414 | 414/545 |
| 5,108,248 A * | 4/1992 | Murrill | B60P 3/1025 | 414/462 |
| 5,108,252 A * | 4/1992 | Gilmore, Jr. | E02F 3/364 | 414/694 |
| 5,119,961 A * | 6/1992 | Runn | B66C 23/44 | 212/180 |
| 5,123,799 A * | 6/1992 | Breazeale | B60P 3/1025 | 414/462 |
| 5,213,466 A * | 5/1993 | Bubik | B60P 1/6463 | 414/494 |
| 5,232,329 A * | 8/1993 | Livingston | B60P 1/54 | 414/462 |
| 5,249,910 A * | 10/1993 | Ball | B60P 3/1058 | 114/344 |
| 5,259,721 A * | 11/1993 | Sato | B66F 9/061 | 414/620 |
| 5,277,275 A * | 1/1994 | Ablabutyan | B60P 1/4414 | 187/272 |
| 5,380,141 A * | 1/1995 | Flowers | B60P 3/122 | 224/310 |
| 5,393,191 A * | 2/1995 | Alexander | B60P 1/43 | 414/477 |
| 5,427,495 A * | 6/1995 | Vlaanderen | B60P 1/483 | 414/498 |
| 5,620,296 A * | 4/1997 | McMahon | B60P 1/6463 | 414/462 |
| 5,752,799 A * | 5/1998 | Carey | B60P 1/5471 | 224/403 |
| 5,897,284 A * | 4/1999 | Ardohain | B63C 3/06 | 414/522 |
| 5,921,741 A * | 7/1999 | Heimgartner | B60P 3/1025 | 414/462 |
| 6,152,674 A * | 11/2000 | Ogrodnick | B60P 1/6463 | 414/491 |
| 6,164,895 A * | 12/2000 | Croswell | B60P 1/4485 | 414/462 |
| 6,183,187 B1 * | 2/2001 | Ablabutyan | B60D 1/02 | 187/272 |
| 6,412,582 B1 * | 7/2002 | Leavitt | B62K 13/00 | 180/182 |
| 6,413,033 B1 * | 7/2002 | Monroig, Jr. | B60P 3/122 | 414/462 |
| 6,457,931 B1 * | 10/2002 | Chapman | B60P 1/6463 | 414/462 |
| 6,607,345 B2 * | 8/2003 | McElhany | B60P 1/4407 | 414/462 |
| 7,300,239 B2 * | 11/2007 | Benedikt | B60P 1/6463 | 414/477 |
| 7,381,019 B1 * | 6/2008 | Boice | B60P 3/07 | 410/3 |
| 7,441,995 B2 * | 10/2008 | Sobota | A61G 3/06 | 410/7 |
| 7,811,045 B2 * | 10/2010 | Butta | B60R 9/06 | 224/509 |
| 8,089,167 B2 * | 1/2012 | Alvite | F03B 17/04 | 290/1 C |
| 8,998,556 B2 * | 4/2015 | Learned | B60P 1/6445 | 414/498 |
| 9,048,706 B1 * | 6/2015 | Maloney | E05D 15/0621 | |
| 9,166,459 B1 * | 10/2015 | Bahamdain | H02K 7/1853 | |
| 9,403,469 B2 * | 8/2016 | Parker | B60P 1/4414 | |
| 9,616,796 B2 * | 4/2017 | Russo | B60P 1/4421 | |
| 9,738,205 B2 * | 8/2017 | Parker | B60P 1/4414 | |
| 9,789,802 B2 * | 10/2017 | Bartelt | B60P 1/6463 | |
| 9,850,095 B2 * | 12/2017 | Moon | B66B 7/00 | |
| 2005/0006181 A1 * | 1/2005 | Lee | B66B 11/0484 | 187/270 |
| 2008/0138183 A1 * | 6/2008 | Lin | B60P 1/4421 | 414/546 |
| 2008/0206031 A1 * | 8/2008 | Butta | B60R 9/06 | 414/462 |
| 2009/0127864 A1 * | 5/2009 | Alvite | F03B 17/04 | 290/1 C |
| 2010/0038846 A1 | 2/2010 | Baena, Jr. et al. | | |
| 2010/0124479 A1 * | 5/2010 | Brooks | B60P 1/4414 | 414/557 |
| 2014/0079517 A1 * | 3/2014 | Ablabutyan | B60P 1/445 | 414/546 |
| 2015/0050107 A1 * | 2/2015 | Kipp | B60P 1/02 | 414/462 |
| 2015/0204299 A1 * | 7/2015 | Jones | F03B 7/006 | 290/54 |
| 2015/0217670 A1 * | 8/2015 | Ablabutyan | B60P 1/4414 | 414/546 |
| 2016/0129825 A1 * | 5/2016 | Parker | B60P 1/4414 | 414/343 |

FOREIGN PATENT DOCUMENTS

| | | |
|---|---|---|
| DE | 20 2009 009 056 U1 | 12/2009 |
| DE | 10 2008 032 717 A1 | 1/2010 |
| DE | 10 2009 007 954 A1 | 8/2010 |
| DE | 10 2010 062 225 A1 | 5/2012 |
| WO | WO 85/04387 A1 | 10/1985 |
| WO | WO 2011/107815 A1 | 9/2011 |
| WO | WO 2012/123513 A1 | 9/2012 |

* cited by examiner

REDUCING THE ENERGY CONSUMPTION IN A SYSTEM

CROSS-REFERENCE TO RELATED PATENT APPLICATIONS

This patent application is a continuation of PCT/EP2014/061019, filed May 28, 2014, which claims priority to German Application No. 10 2013 106 052.8, filed Jun. 11, 2013, the entire teachings and disclosure of which are incorporated herein by reference thereto.

FIELD OF THE INVENTION

The present invention concerns the reducing of the energy consumption in a system, in particular in a system in which devices are used for receiving and transporting objects.

BACKGROUND OF THE INVENTION

Such a system may be, for example, a sorting system. In a sorting system, objects can be sorted by a sorter on the basis of prescribed criteria. End locations of the sorting system have a buffering function and serve for the logistical decoupling of the sorter from further processing. End locations may, for example, take the form of a single-stage or multi-stage slide, on which the objects discharged by the sorter on the basis of a specific criterion are buffer-stored until removal, sliding down one after the other. The objects may then be loaded by a person into a device in which the objects are transported further. In the case of a package sorting system, the device may be, for example, a roller container, in which packages discharged by the sorter are brought into a swap body or semitrailer, which is then driven to a destination by means of a truck. However, sorting systems may also be used for sorting any other desired objects, such as for example pieces of baggage.

In other systems, devices may be used for receiving and transporting objects without prior sorting, such as for instance final products or intermediate products in a production plant.

SUMMARY OF THE INVENTION

One of the objects of the invention is to provide a possible way of reducing the net energy consumption of a system.

An exemplary embodiment of a system according to the invention comprises a device for receiving and transporting objects and a generator. The device has an adjusting mechanism and a base that can be adjusted in height by means of the adjusting mechanism. The adjusting mechanism is designed in such a way that the base can be lowered by a weight of objects received. The adjusting mechanism is also able to be connected or is connected to the generator in such a way that the generator is driven and converts mechanical energy into electrical energy while the base is being lowered.

An exemplary embodiment of a device according to the invention for receiving and transporting objects accordingly comprises an adjusting mechanism and a base that can be adjusted in height by means of the adjusting mechanism. The adjusting mechanism is in this case designed in such a way that the base can be lowered by a weight of objects received. The adjusting mechanism is also designed for connecting the adjusting mechanism to a generator in such a way that the generator is driven while the base is being lowered. The device may be, for example, a transport carriage or a container without wheels. Such a container could, for example, be moved on a conveyor strap or on a separate chassis with wheels.

An exemplary embodiment of a method according to the invention comprises transferring a mechanical energy occurring at an adjusting mechanism of a device for receiving and transporting objects to a generator when a base of the device that can be adjusted in height by means of the adjusting mechanism is being lowered as a result of a weight of objects received. The method also comprises converting the mechanical energy into electrical energy by the generator.

The invention is based on the idea that sorters in a conventional sorting system transport and discharge objects at a certain height. Packages, taken as examples of objects, in this case weigh on average 5 kg, and a sorter taken as an example discharges 20 000 of such packages per hour. The packages discharged consequently have in total a considerable potential energy. Corresponding considerations apply to sorting systems in which other objects are sorted, and also to systems in which, though objects are not sorted, they are provided for being transported in relatively great quantities.

For certain embodiments given by way of example, therefore, the invention provides that a device for receiving and transporting objects has a base, the height of which can be set variably by means of an adjusting mechanism. If the device is filled with objects, the base is lowered under the load. The potential energy of the objects is thereby converted into mechanical energy at the adjusting mechanism. If this mechanical energy is fed to a generator, for instance by way of a coupling, the generator can convert the mechanical energy into electrical energy and provide it for use.

The adjustable base allows, for example, objects to be brought automatically into a device for transporting the objects without manual labor being necessary. Since the maximum drop height for the objects can be limited by the adjustment of the base, the risk of damage can be minimized With automatic loading of devices, the storage area of end locations, and consequently the space requirement of the system as a whole, can also be reduced. The transport carriage itself provides the necessary buffering function. As a result, other forms of the system as a whole also become possible. Furthermore, if loading of the device by personnel is intended, the work of the personnel is facilitated and the risk of damage minimized This aspect is therefore also of advantage in itself.

The conversion of the mechanical energy occurring during the lowering of the base into electrical energy allows the energy balance of a system in which the device is used to be improved. The mechanical energy is in this case provided by conversion of the potential energy of the objects loaded into the device.

In an embodiment of the system given by way of example, the device itself comprises the generator. In that case, the system according to the invention may exclusively comprise the device, but optionally also further components or all of the components of an entire system.

In another embodiment of the system given by way of example, on the other hand, the generator is arranged outside the device. As a result, a weight increase of the device and movable electrical equipment on the device can be avoided. In that case, the system according to the invention may exclusively comprise the device and the external generator, but optionally also in turn further components or all of the components of an entire system.

In an embodiment of the system given by way of example, the system comprises at least one guiding element designed for guiding the device to a prescribed position, at which the adjusting mechanism can be connected to an external generator. In addition or as an alternative, in an embodiment given by way of example, the system comprises at least one connecting element designed for fixing the device at a prescribed position, at which the adjusting mechanism can be connected to an external generator. Both can have the effect that undesired loads on the movable connection between the adjusting mechanism and the generator are minimized.

In an embodiment of the system given by way of example, the energy provided by the generator is fed into a power supply system. This may be, for example, a public power supply system or an in-house power supply system. As a result, the energy is available for any desired use. In particular if the generator is part of the device, the electrical energy provided by the generator may however also be used directly, in order to charge a rechargeable battery or a capacitor of the device. The stored electrical energy is then available, for example, for functions of the device.

In an embodiment of the system given by way of example, the generator has a brake, and the generator is connected or can be connected to the adjusting mechanism in such a way that the base is only lowered by the weight of objects received when the brake is released. This can offer the advantage that the base can be lowered step by step.

In a refinement of this embodiment given by way of example, the system also comprises at least one sensor for monitoring the height of the objects received and a control circuit. The control circuit may be designed in such a way the brake is released in dependence on an output signal of the sensor. This can offer the advantage that the base of the device can, for example, always be lowered specifically just so far that the objects do not fall out of the device during the loading operation. This allows the drop height of the objects into the device to be minimized during the entire loading operation.

The at least one sensor may be, for example, a sensor for visible or non-visible light, which is emitted from a corresponding light source. The light source and the sensor can then form a light barrier. Such a light source may likewise be part of an embodiment of a system according to the invention.

A sensor may be part of the device, or be attached outside the device.

If the at least one sensor is fastened to the device and the generator is arranged outside the device, the system may in an embodiment given by way of example also comprise communication means for transmitting a signal based on an output signal of the sensor to the control unit. The communication means may in this case comprise components on the device and outside the device that are suitable for communication with one another. They may be, for example, Bluetooth modules, infrared interface modules or other modules for radio-based communication. The communication means could, however, also allow line-based communication, the connection necessary for this between the sensor and the control unit being able to be established when the generator is connected to the adjusting mechanism.

In an embodiment of the system given by way of example, the system also comprises a motor, the motor being connected or being able to be connected to the adjusting mechanism in such a way that the base can be raised by means of the motor. The provision of a motor can offer the advantage that the base does not have to be moved manually into a higher position. The motor need not necessarily be provided here as a separate component. It is also possible to use an alternating-current machine, which can be operated both as a generator and as a motor.

In an embodiment of the system given by way of example, the base is the base of a bag. The adjusting mechanism may then comprise straps for gathering the bag and rollers for rolling up and unrolling the straps, the rollers being connected or being able to be connected to the generator. The gathering of the bag should be understood as meaning a way of making the volume of the bag smaller, which can be realized in any manner desired. Thus, for example, the straps could be connected only to the base of the bag that is to be drawn up during the rolling up of the straps. Alternatively, the straps could, for example, be additionally incorporated in the sides of the bag by eyelets, so that the bag is gathered at the sides during the rolling up of the straps. The use of a bag for receiving the objects allows the device to be of a particularly lightweight design. If a motor is additionally provided, it may likewise be connected or be able to be connected to the rollers for raising the base.

It goes without saying, however, that, instead of rollers and straps, other adjusting mechanisms that are connected or can be connected to a generator may also be used. Thus, the device could have fixed side walls, for instance in the form of a metal grid, and a base could be moved up and down by means of a spindle drive.

Further advantageous refinements of the invention given by way of example can be taken from the following more detailed description of some embodiments of the present invention that are given by way of example, in particular in conjunction with the figures. The figures are only intended, however, for the purpose of illustration, and do not serve for determining the protective scope of the invention. The figures are not to scale and are merely intended to reflect the general concept of the present invention by way of example. In particular, features that are contained in the figures are not in any way intended to be regarded as absolutely necessary constituents of the present invention.

DETAILED DESCRIPTION OF THE INVENTION

The present invention is described below on the basis of embodiments given by way of example that allow reducing of the energy consumption in a system.

Figure 1:
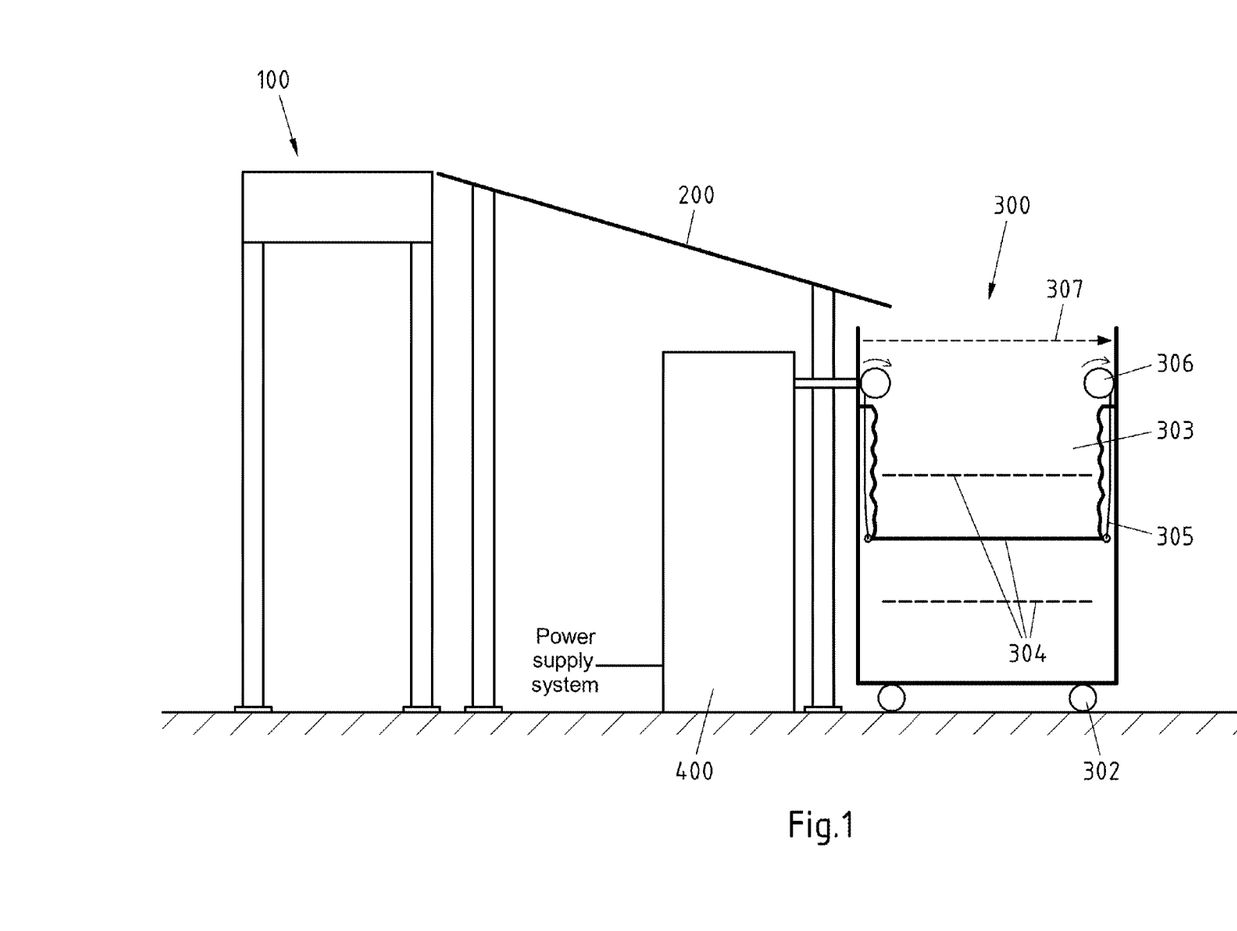
FIG. 1 shows a schematic representation of an embodiment of a system according to the invention that is given by way of example.

FIG. 1 is a schematic representation of an embodiment of a system according to the invention that is given by way of example. As an example, the system is taken to be a package sorting system.

The system comprises a sorter 100, for example a cross-strap or tilt-tray sorter. The sorter 100 transports packages at a certain height, until they are discharged at a respective end location. End locations are provided at a number of locations of the sorter 100 in the form of a slide 200.

The system also comprises a number of transport carriages. A transport carriage 300 may for instance be a rolling container. Unlike a roller container, which is dimensioned on the basis of old British imperial units, a rolling container may have the dimensions of a pallet. For example, a base frame 301 or transport frame of the transport carriage 300 delimits a substantially cuboidal space. The upper periphery of the transport carriage 300 is somewhat lower than the lower end of a slide 200.

The transport carriage 300 has wheels 302, in order to allow easy pushing or pulling of the transport carriage 300.

Fitted within the base frame 301 of the transport carriage 300 is a bag 303. The bag consists of a textile or other flexible material. The use of a bag 303 means that the requirements for the side walls are much less stringent than in the case of a conventional roller container. The base 304 of the bag 303 is adjustable in height; two broken lines in FIG. 1 indicate alternative heights with respect to a height given here by way of example as applicable at the time. The base 304 itself may consist of the same material as the bag 303. In that case, the base 304 may have in a way similar to a fisherman's net an opening in the form of an annular hole, which can be safely opened even manually under a load. For applications in which emptying of the bag 303 in the downward direction is possible, this can facilitate handling. As an alternative or in addition, the base 304 may consist of a rigid material, for instance in the form of a board. For the adjustability of the base 304, the transport carriage 300 has straps 305 which are attached laterally to the bag 303, and also rollers 306 which are arranged in the upper region of the transport carriage 300 and onto which the straps 305 can be wound up. Any number of straps 305 and associated rollers 306 may be provided, for example a strap 305 on each side of the bag along the four vertical edges of the base frame 301 of the transport carriage 300, and a roller 306 at each corner in the upper region of the transport carriage 300. At least one of the rollers 306 is connected or can be connected to at least one coupling (not represented).

The system also has a device 400 with an alternating-current machine, which may be arranged under the slide 200 or under the sorter 100. The alternating-current machine may be operated as a motor or as a generator. Alternatively, the device 400 could also have a motor and a generator as separate units, or just a generator. The alternating-current machine is on the one hand connected to a power supply system. On the other hand, the alternating-current machine is connected or can be connected, for example by a gear mechanism, to the at least one coupling. The at least one coupling itself may therefore be part of the transport carriage 300 or of the device 400.

The system also has a light source (not represented) and a light sensor (not represented), which can together form a light barrier 307. The light source may be, for example, a light-emitting diode, but similarly any other desired light source. The light sensor may be, for example, a phototransistor, but similarly any other desired light sensor. The light source and the light sensor are arranged in such a way that a light signal of the light source can be detected by the light sensor as long as packages in a transport carriage 300 standing at the slide 200 do not reach up to just below the upper periphery of the transport carriage 300. The light sensor is connected to a control unit for the alternating-current machine.

The system may optionally have any other desired components not represented here.

Thus, the system may have guiding elements, with which a transport carriage can be moved in a guided manner under a slide 200 in precisely such a way that the rollers 306 of the transport carriage 300 are connected by way of the coupling to the alternating-current machine of the device 400.

Figure 2:
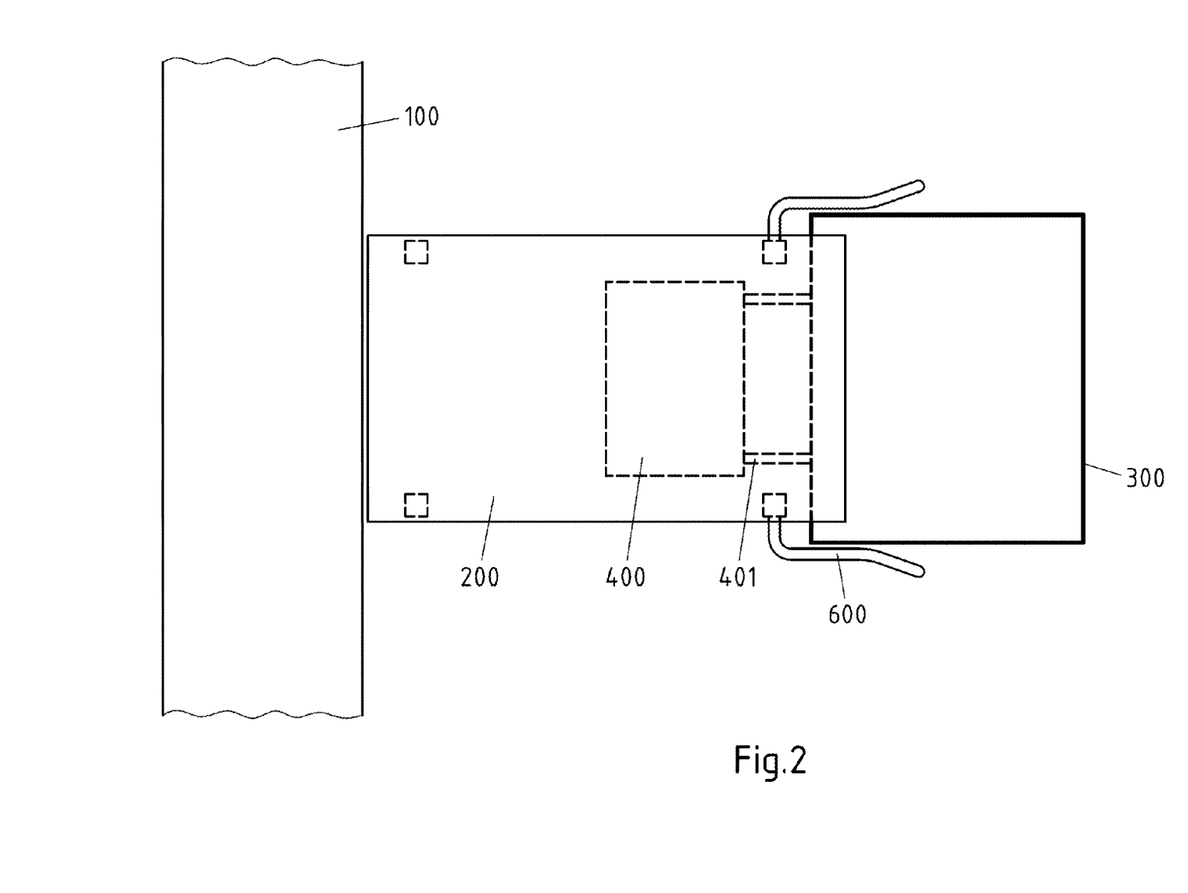
FIG. 2 shows a schematic representation of a plan view of the system from FIG. 1.

FIG. 2 is a schematic representation of a plan view of the system from FIG. 1, in which guiding elements given by way of example are represented. At any desired height between the base and the lower end of a slide 200, a bar 600 is attached on each side of the slide 200. The bars 600 serve as guiding elements for a transport carriage 300. If a transport carriage 300 is pushed to the lower of the slide 200, it is ensured that couplings on the transport carriage 300 are connected to linkages 401 of the device 400, or that connecting elements for couplings on the transport carriage 300 are connected to couplings on the device 400.

A light source and a light sensor could, for example, be arranged on opposite guiding elements. A light source and a light sensor could, for example, also be arranged next to one another, while a reflector is arranged opposite. Thus, a light source and a light sensor could for instance be arranged on one guiding element and a reflector could be arranged on an opposite guiding element; or a light source and a light sensor could be arranged under a slide 200 and a reflector could be arranged at the upper periphery of each transport carriage 300. A light source and a light sensor could alternatively both be arranged at an upper periphery of each transport carriage. As a further alternative, one component could be arranged on the transport carriage 300 and another component could be arranged outside the transport carriage 300. If the light source and the light sensor are arranged outside the transport carriage 300, this can have the advantage that there is no need for a power supply for the light barrier in the transport carriage 300 and no need for a communication unit for transmitting the measurement result of the light sensor to the control unit for the alternating-current machine. Furthermore, fewer light sources and/or light sensors are required, because the same light sources and/or light sensors can be used for a multiplicity of transport carriages 300, and light sources and/or light sensors can be damaged less easily during loading. On the other hand, the provision of light sources and/or light sensors on a transport carriage can make it easier to monitor the desired region.

The system may also have connecting elements (not represented), with which a transport carriage 300 can be connected to a fixed component. Each connecting element may provide a first part on a transport carriage 300 and a complementary part installed at a fixed position. However, there could also only be connecting elements installed at a fixed position, for example in the form of a joining part of a snap connection, which then, for example, interengage with a not especially adapted base frame 301 of a transport carriage 300. Such connecting elements may also be combined with the coupling.

The transport carriage 300 is an embodiment of a device according to the invention that is given by way of example.

Figure 3:
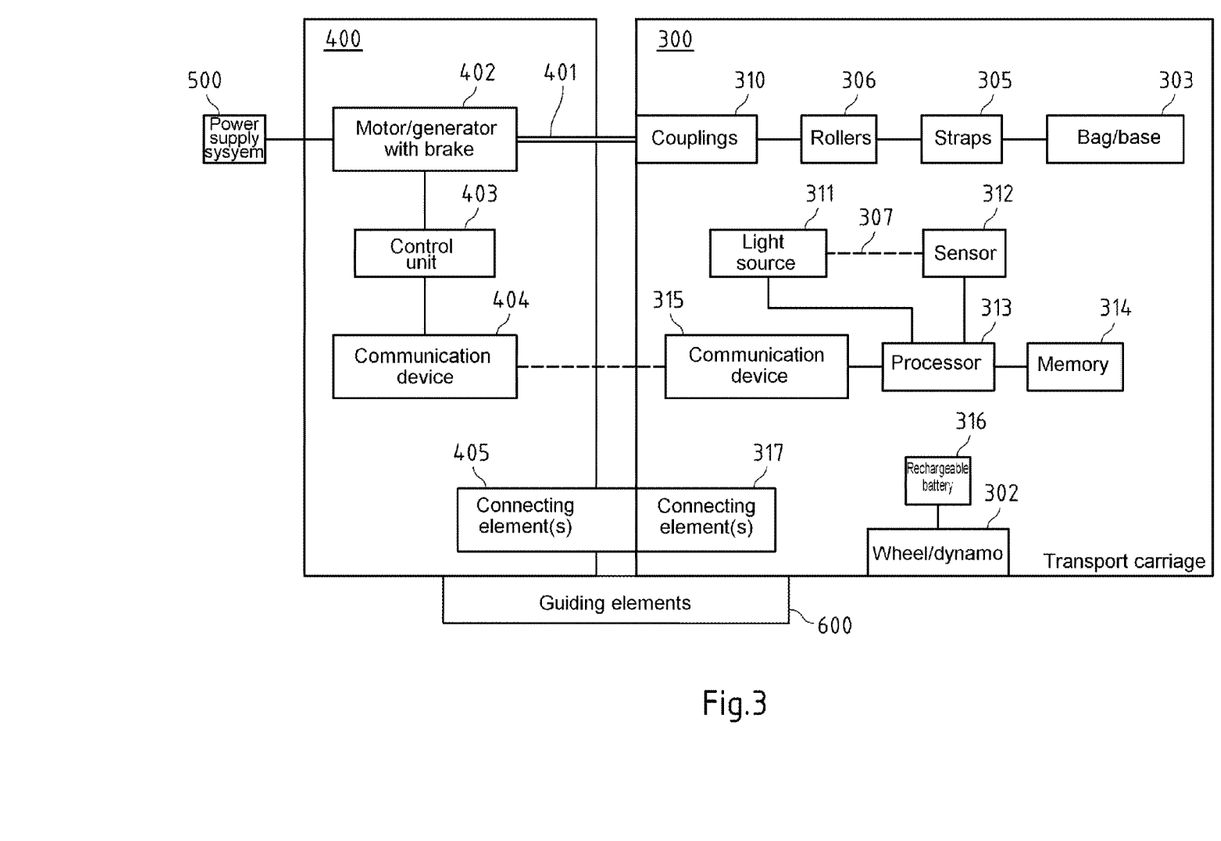
FIG. 3 shows a block diagram of an embodiment of a system according to the invention that is given by way of example.

In FIG. 3, selected components of the system from FIG. 1 are represented in a block diagram, in particular components of the transport carriage 300 and the device 400.

The transport carriage 300 comprises a bag 303 for receiving packages, straps 305 connected to the bag 303 and rollers 306 for rolling up and unrolling the straps 305. The rollers 306 are connected to couplings 310, which are represented here by way of example as part of the transport carriage 300. For example, a dedicated coupling 310 may be respectively provided for a pair of rollers 306 arranged one behind the other on an axis. The transport carriage 300 also comprises a light source 311 and a light sensor 312 for providing a light barrier 307. The transport carriage 300 also comprises a processor 313, which is connected to the light source 311, the light sensor 312, a memory 314 of the transport carriage 300 and a communication device 315 of the transport carriage 300. The memory 314 may store program instructions for the processor 313, data on the transport carriage 300, data on loaded packages and/or other information. The processor 313 may execute program instructions stored in the memory 314 and thereby instigate specific, intended actions. The communication device 315 may, for example, allow at least one kind of wireless communication. It may comprise for instance a Bluetooth module, an infrared interface module and/or a transponder.

The processor 313 may be, for example, a microprocessor. The processor 313 may be connected to further components (not represented) of the transport carriage 300, such as to a USB interface, a display, etc. Using the processor 313 and the communication means 315, the transport carriage 300 can act as a partially autonomous system in the logistics environment.

The transport carriage 300 also has four wheels 302. At least one of the wheels 302 could have a dynamo, which provides energy for a rechargeable battery 316 or for capacitors of the transport carriage 300. Alternatively, such a rechargeable battery 316 could, however, also be regularly charged by way of some other source in the transport carriage 300 or outside the transport carriage 300. The light source 311, the light sensor 312, the processor 313 and the communication device 315 are supplied with energy from the rechargeable battery 316. If need be, the energy from the rechargeable battery 316 may also be used for various other functions of the transport carriage 300. The rechargeable battery 316, the processor 313, the memory 314 and the communication device 315 could be arranged in the transport carriage 300, for example above the wheels 302 and below the lowermost position of the base 304.

The transport carriage 300 also has by way of example at least one connecting element 317. A connecting element 317 may be formed as a unit with a coupling 310 or separately. If connecting elements 317 are attached on each side of a transport carriage 300, they may also be used for connecting a number of transport carriages 300 to one another, one behind the other and one next to the other. As a result, a group of transport carriages 300 can be brought particularly easily from a loading ramp into the loading space of a truck or into a swap body or semitrailer for a truck.

A connecting element 317 of a transport carriage 300 could also be formed as a towbar, so that a number of transport carriages 300 can be linked up by way of the towbar(s) to form a train and, by means of a positive and non-positive connection, mechanically represent an entity.

The device 100 comprises a motor and a generator with a brake 402. The motor and the generator 402 may in this case optionally be the same machine in different operating modes. The motor and the generator 402 are connected to a power supply system 500 of the system. A control unit 403 of the device 400 is connected to the motor and the generator 402 and also to a communication device 404 of the device 400. The communication device 404 is formed in such a way that it can communicate with the communication device 315 of a respective device 300. The device 400 also comprises a linkage 401 for connecting the motor and the generator 402 to the at least one coupling 310 of a respective transport carriage 300. The device 400 comprises at least one connecting element 405, which is complementary to the at least one connecting element 317 of a respective transport carriage 300.

The system also comprises guiding elements 600, which can be connected in a stable way to the device 400 or to other stable elements of the system, for example to supporting bars for the slide 200 as indicated in FIG. 2, or if appropriate also directly to the base.

The system from FIGS. 1 to 3 may be modified in various ways, both by omitting components and also by adding components. In this way, further or alternative advantages can be obtained.

Figure 4:
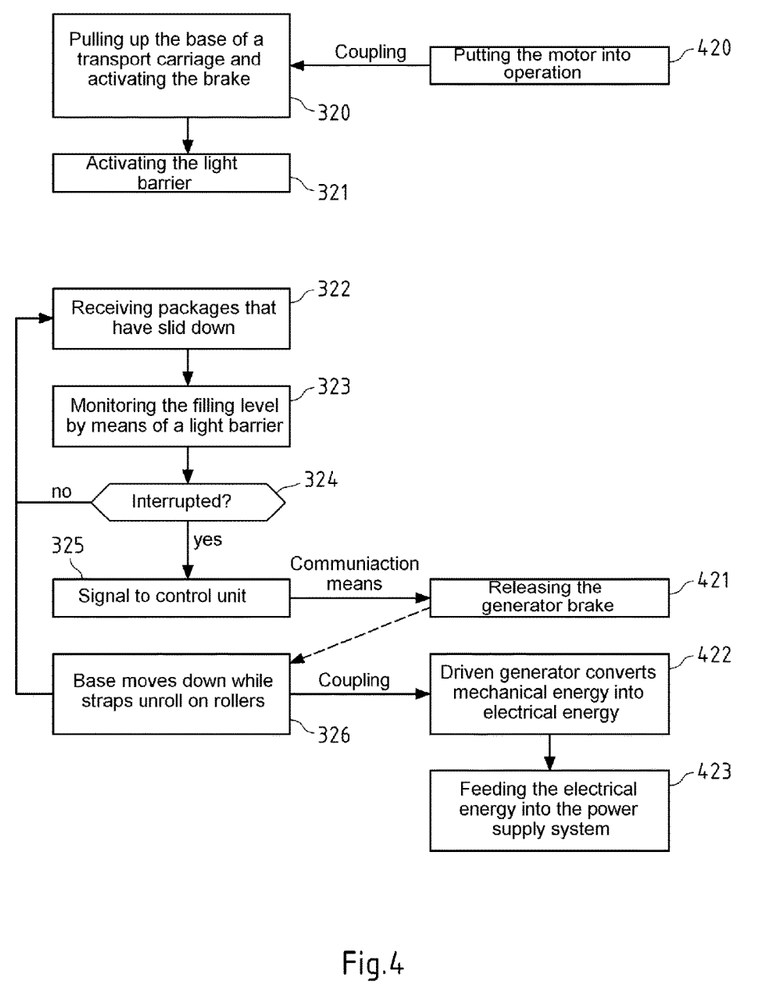
FIG. 4 shows a flow diagram with method steps of an embodiment of the method according to the invention that is given by way of example.

FIG. 4 is a flow diagram, which illustrates an operation in the system from FIGS. 1 to 3 according to an exemplary embodiment of a method according to the invention that is given by way of example. The left-hand side shows operations on a transport carriage 300 and the right-hand side shows operations on the device 400.

A transport carriage 300 is to be filled with packages, which are discharged at a specific slide 200. If a person drives the transport carriage 300—guided by the guiding elements 600—under the slide 200, the linkage 401 of the device 400 engages in the couplings 310 of the transport carriage 300. Complementary connecting elements 317, 405 on the transport carriage 300 and the device 400 provide a rigid connection, in order that the connection between the motor or generator 402 and the rollers 306 is subjected to as little loading as possible in horizontal and vertical directions by way of the couplings 310 when establishing this connection, when releasing this connection and when loading the transport carriage 300.

When the transport carriage 300 has assumed the final loading position at the slide 200, the motor 402 is put into operation by the control unit 403 (action 420). This may, for example, take place by way of a switch connected to the control unit 403, which is automatically actuated when the transport carriage 300 is connected to the device 400. Alternatively, putting the motor 402 into operation may, for example, be initiated by a person. The energy supply for the motor 402 is made available by the power supply system 500. The motor 402 turns the rollers 306 by way of the couplings 310 in such a way that the straps 305 are wound up and the sides of the bag 303 are gathered, whereby the base 304 of the bag 303 is pulled up (action 320). If the load on the motor 402 increases, because the straps 305 have been rolled up substantially as far as possible, the motor 402 is automatically switched off by the control unit 403. Furthermore, the control unit 403 then instigates the activation of the brake.

It goes without saying that the raising of the base 304 could alternatively take place during an unloading of the transport carriage 300, in order to facilitate the unloading. In that case, the device 400 need not also have a motor, because the transport carriage 300 is then driven under the slide 200 already with the base 304 pulled up.

As soon as the transport carriage 300 is in the correct position or as soon as the base 304 has reached its uppermost position, the light source 311 is also switched on and the sensor 312 activated (action 321). The sensor 312 detects a light beam from the light source 311.

The transport carriage 300 receives the packages sliding down on the slide 200 (action 322). Since the pulled-up base 304 of the transport carriage 300 is in relatively close proximity under the lower edge of the slide 200, the packages do not fall far and are consequently transported into the transport carriage 300 relatively gently.

At the same time, the filling level is monitored by means of a light barrier 307 (action 323). As soon as the light sensor 312 establishes that the light beam from the light source 311 is no longer being detected, therefore that the light barrier 307 has been interrupted (action 324), the sensor 312 transmits corresponding information to the processor 313. In response, the processor 313 causes the communication device 315 to notify the device 400 by means of a prescribed signal (action 325).

The communication device 404 of the device 400 receives the signal and passes it on to the control unit 403. The control unit 403 then releases the brake of the generator 402 for a prescribed number of revolutions (action 421).

Up until this point in time, the brake had ensured that the generator 402 could not be driven. In this way, the rollers 306 were also blocked by way of the linkage 401 and the couplings 310. It was thus possible to prevent the straps 305 from unrolling completely as a result of the weight of the first loaded packages, so that the bag base 304 assumes its lowermost position and following packages fall ungently over a greater height into the transport carriage 300.

With the brake released, the rollers 306 can then turn. As a result of the weight of the packages loaded thus far in the bag 303, the base 304 of the bag 303 moves down a little, while the straps 305 are being unrolled (action 326).

The rollers 306 turning thereby transfer the mechanical energy by way of the couplings 310 and the linkage 401 to the generator 402. The driven generator 402 converts the mechanical energy into electrical energy (action 422).

Electrical energy is fed into the power supply system 500 (action 423).

After the prescribed number of revolutions of the generator 402, the brake is activated again. With the lowering of the base 304 of the bag 303, the already loaded packages were also lowered, so that the light barrier 307 is released again. The method (actions 322-326 and 421-423) is continued until the base 304 of the bag 303 has reached the lowermost position. In that case, a person can then exchange the transport carriage 300.

In the system presented, packages can be automatically brought into a transport carriage 300 relatively gently in that, during the loading, the base 304 of the transport carriage 300 is lowered in a number of stages by making use of the potential energy of the packages already loaded, while the mechanical energy occurring during the loading is converted into electrical energy and is provided for further use.

It goes without saying that the method can be modified in various respects.

For example, in fully automatic loading of a transport carriage 300, an arrangement of the packages with large clearances in between them is produced during the loading, similar to pores in rock. This arrangement can be disturbed by specific upward and downward movement of the base in the transport carriage. This causes settling movements, and the loading density of the transport carriage 300 is optimized.

Depending on operational activities, transport carriages 300 can also repeatedly go to one or more end locations.

The communication device 315 of a transport carriage 300 could be additionally used to make an identification of the transport carriage 300 available to an end location or any desired control station by way of an RFID (radio-frequency identification) transponder of the communication device 315. An identification of the transport carriage 300 may, however, also take place by means of a barcode. The communication device 315 of a transport carriage 300 could also be used for the purpose of receiving information on loaded packages, such as for example information about their destination or the filling level. For example, information on loaded packages may be provided by the communication device 404 or by a further communication device of the end location. Information obtained may, for example, be stored by the processor 313 in the memory 314. At other locations, the information may be read out, or the information may be exchanged between transport carriages 300. Information stored in a transport carriage 300 may be used as a basis for decisions and/or during the course of quality controls.

The connections between components that are represented or described should be understood as functional connections. They may be realized directly or indirectly by way of a number of other components. The sequence of the described actions in the flow diagram is not obligatory; alternative sequences of the method steps are conceivable. The actions may be implemented in various ways.

It goes without saying that the embodiments described are merely examples that can be modified and/or supplemented in various ways within the scope of the claims. In particular, each feature that has been described for a specific exemplary embodiment may be used on its own or in combination with other features in any other desired exemplary embodiment. Each feature that has been described for an exemplary embodiment of one particular category may also be used in a corresponding way in an exemplary embodiment of another category.

The invention claimed is:

1. A system comprising a transport carriage for receiving and transporting objects and a generator,
    the transport carriage having a bag for being filled with objects and an adjusting mechanism,
    the bag having a base that can be adjusted in height by means of the adjusting mechanism,
    the adjusting mechanism comprising straps for gathering the bag and rollers for rolling up and unrolling the straps,
    the straps and the rollers being designed in such a way that the base can be lowered by a weight of objects received, and,
    at least one of the rollers being able to be connected or being connected to the generator in such a way that the generator is driven and converts mechanical energy into electrical energy while the base is being lowered.

2. The system according to claim 1, the generator being one of arranged outside the transport carriage and comprised by the transport carriage.

3. The system according to claim 1, the generator being arranged outside the transport carriage and the system also comprising
    at least one guiding element designed for guiding the transport carriage to a prescribed position, at which the at least one roller can be connected to the generator; and/or
    at least one connecting element designed for fixing the transport carriage at a prescribed position, at which the at least one roller can be connected to the generator.

4. The system according to claim 1, the generator providing the electrical energy in that it feeds the energy into a power supply system.

5. The system according to claim 1, the generator having a brake and the generator being connected or being able to be connected to the at least one roller in such a way that the base is only lowered by the weight of objects received when the brake is released.

6. The system according to claim 5, also comprising at least one sensor for monitoring a height of the objects received and a control unit, the control unit being designed to release the brake in dependence on an output signal of the sensor.

7. The system according to claim 6, the at least one sensor being fastened to the transport carriage and the generator being arranged outside the transport carriage, and the system also comprising communication means for transmitting a signal based on an output signal of the sensor to the control unit.

8. The system according to claim 1, also comprising a motor, the motor being connected or being able to be connected to the adjusting mechanism in such a way that the base can be raised by means of the motor.

9. A transport carriage for receiving and transporting objects comprising a bag for being filled with objects and an adjusting mechanism,
the bag having a base that can be adjusted in height by means of the adjusting mechanism,
the adjusting mechanism comprising straps for gathering the bag and rollers for rolling up and unrolling the straps,
the straps and the rollers being designed in such a way that the base can be lowered by a weight of objects received, and
the adjusting mechanism being designed for connecting at least one of the rollers to a generator in such a way that the generator is driven while the base is being lowered.

10. The transport carriage according to claim 9, the generator being arranged outside the transport carriage and the transport carriage also comprising at least one connecting element designed for fixing the transport carriage at a prescribed position, at which the at least one roller can be connected to the generator.

11. The transport carriage according to claim 9, the generator being arranged outside the transport carriage, the generator having a brake and the generator being connected or being able to be connected to the at least one roller in such a way that the base is only lowered by the weight of objects received when the brake is released, and the transport carriage also comprising at least one sensor for monitoring a height of the objects received and communication means for transmitting a signal based on an output signal of the sensor to a control unit, which is designed to release the brake in dependence on an output signal of the sensor.

12. A method comprising:
transferring a mechanical energy occurring at an adjusting mechanism of a transport carriage for receiving and transporting objects to a generator, the transport carriage comprising a bag for being filled with objects and the adjusting mechanism comprising straps for gathering the bag and rollers for rolling up and unrolling the straps, when a base of the bag that can be adjusted in height by means of the adjusting mechanism is being lowered as a result of a weight of objects received, wherein at least one of the rollers is connected to the generator in such a way that the generator is driven while the base is being lowered; and
converting the mechanical energy into electrical energy by the generator.

13. The method according to claim 12, the generator being arranged outside the transport carriage.

14. The method according to claim 13, also comprising
guiding the transport carriage to a prescribed position, at which the at least one roller can be connected to the generator, by means of at least one guiding element; and/or
fixing the transport carriage at a prescribed position, at which the at least one roller can be connected to the generator, by means of at least one connecting element.

15. The method according to claim 12, also comprising feeding of the electrical energy provided by the generator into a power supply system.

16. The method according to claim 12, the generator having a brake and the generator being connected or being able to be connected to the at least one roller in such a way that the base is only lowered by the weight of objects received when the brake is released.

17. The method according to claim 16, also comprising monitoring a height of the objects received by means of at least one sensor and releasing the brake by means of a control unit in dependence on an output signal of the sensor.

18. The method according to claim 17, the at least one sensor being fastened to the transport carriage and the generator being arranged outside the transport carriage, and the method comprising transmitting a signal based on an output signal of the sensor to the control unit.

19. The method according to claim 12, also comprising raising the base by means of a motor connected to the adjusting mechanism.

20. The method according to claim 12, the objects received being objects provided in a system and the method comprising automatic filling of the transport carriage with the objects discharged in the system.

* * * * *